United States Patent [19]

Baumann et al.

[11] 4,159,047
[45] Jun. 26, 1979

[54] LIQUID OIL FEEDERS

[75] Inventors: John Baumann, Medford; Abraham Abrams, Roslyn Heights; Marvin Broitman, Melville, all of N.Y.

[73] Assignee: Uniwave, Inc., Farmingdale, N.Y.

[21] Appl. No.: 769,132

[22] Filed: Feb. 16, 1977

[51] Int. Cl.² .................. F16N 25/00; F16N 27/00
[52] U.S. Cl. ................................... 184/83; 222/305
[58] Field of Search ............ 184/7 D, 7 R, 83, 81, 184/66, 67, 74; 222/356, 357, 358, 305

[56] References Cited

U.S. PATENT DOCUMENTS

| | | | |
|---|---|---|---|
| 610,222 | 9/1898 | Blom | 184/81 UX |
| 909,471 | 1/1909 | Stahli | 184/83 X |
| 1,202,895 | 10/1916 | Rogers | 184/67 |
| 2,167,690 | 8/1939 | Serinis | 222/356 X |
| 2,327,124 | 8/1943 | Morse | 222/305 |
| 2,611,939 | 9/1952 | Kux | 222/357 X |
| 2,621,758 | 12/1952 | White | 184/83 |
| 2,626,016 | 1/1953 | Kiefer | 184/81 |
| 2,729,365 | 1/1956 | Fettkether et al. | 222/305 |
| 3,171,570 | 3/1965 | Reed | 222/356 X |

*Primary Examiner*—David H. Brown
*Attorney, Agent, or Firm*—Blum, Moscovitz, Friedman & Kaplan

[57] ABSTRACT

A liquid-oil feeder is provided for supplying various metered amounts of oil to a plurality of regions. The feeder has a tank of oil and an oil pick-up chamber reciprocating in and out of the supply of oil. The chamber contacts a transfer plate and a longitudinally adjustable rod displaces the oil from the chamber to the transfer plate. The metered amount of oil then flows from the transfer plate through a spout to an outlet leading to an oil line for carrying the oil to the various regions. A plurality of such chambers and transfer plates, displaced as a unit and each associated with a separate adjustable rod and outlet, may be provided. The feeder is capable of supplying oil in a continuous flow of droplets and also has flushing apparatus for supplying a stream of oil to various regions.

29 Claims, 15 Drawing Figures

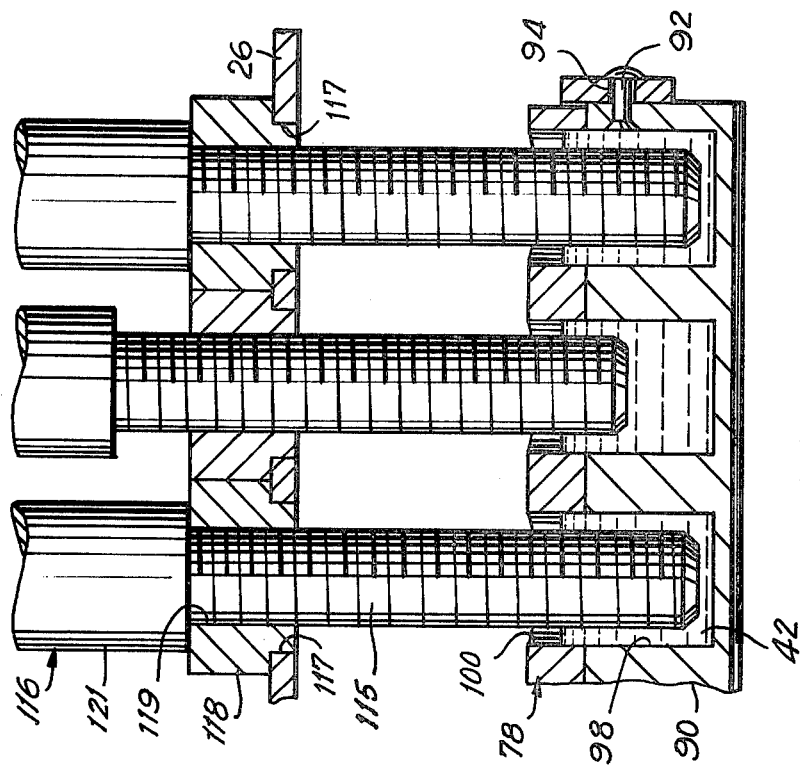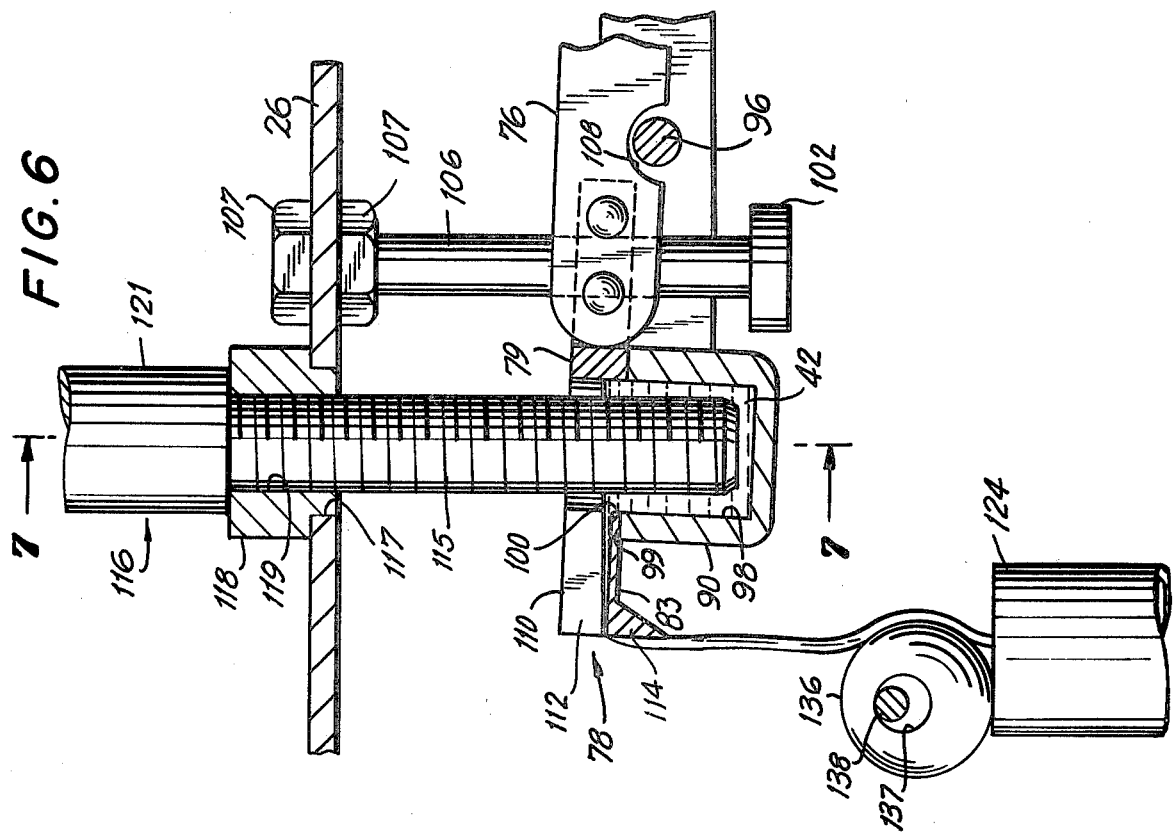

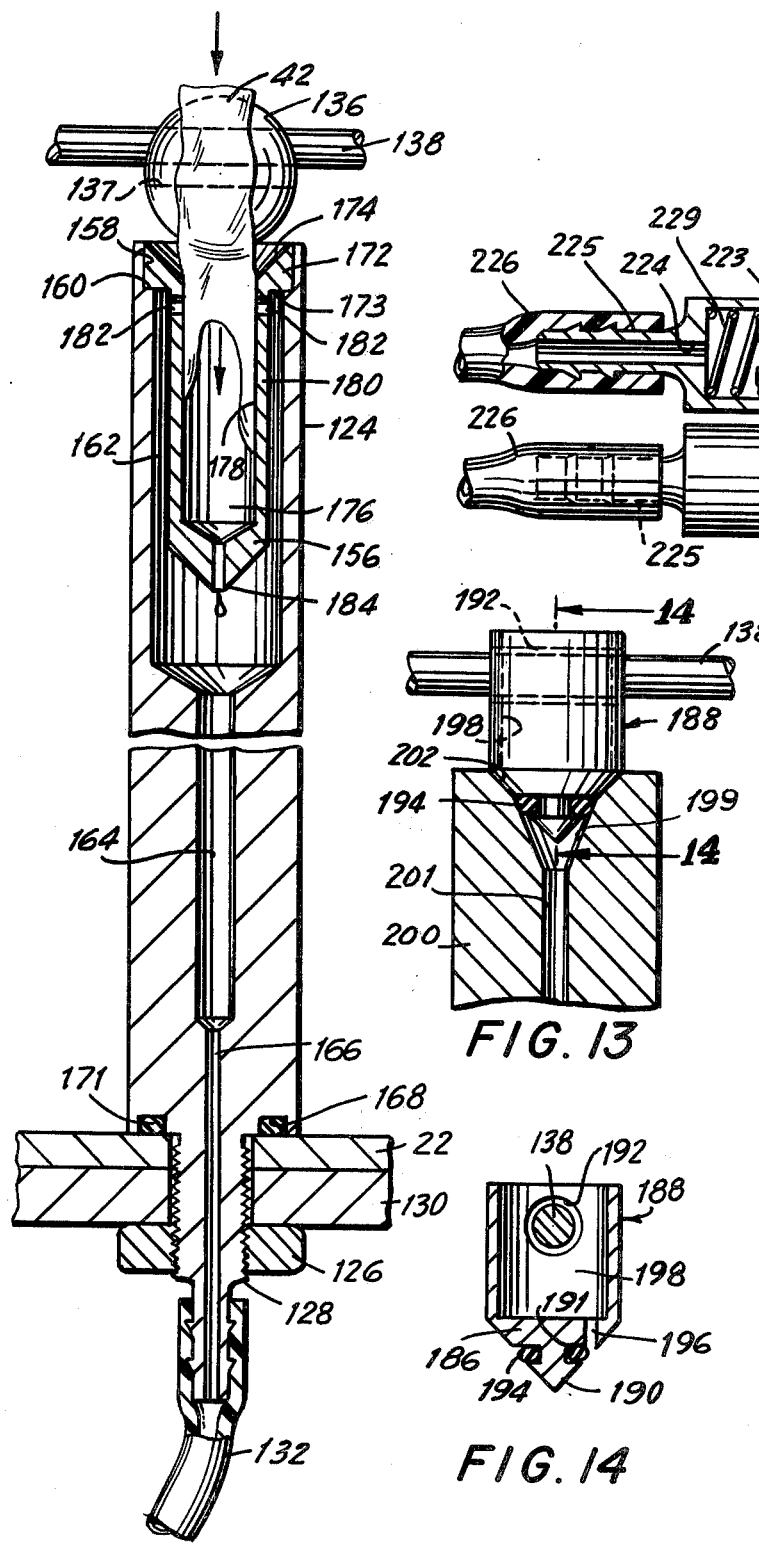
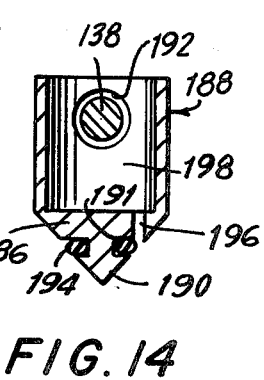
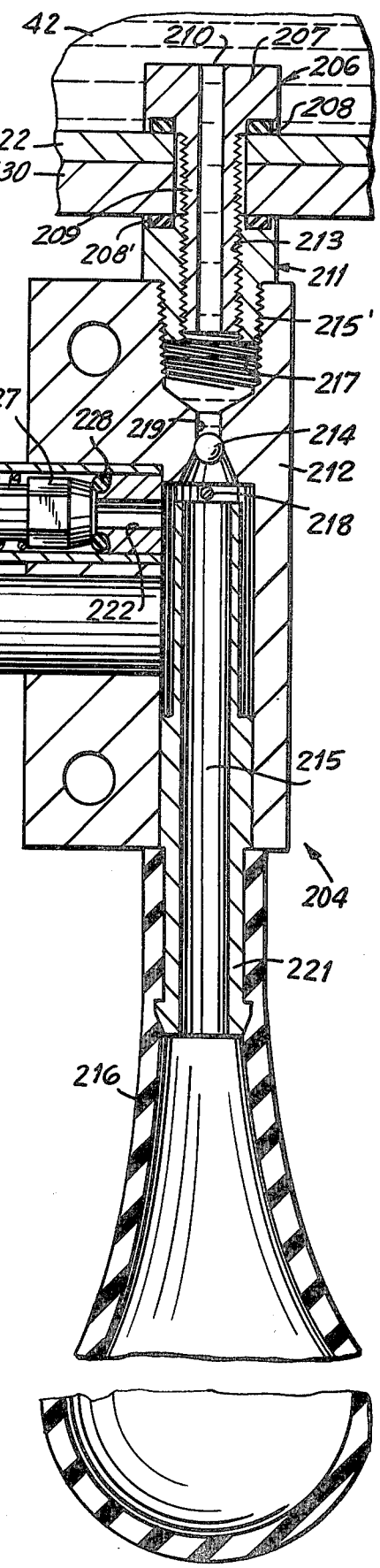

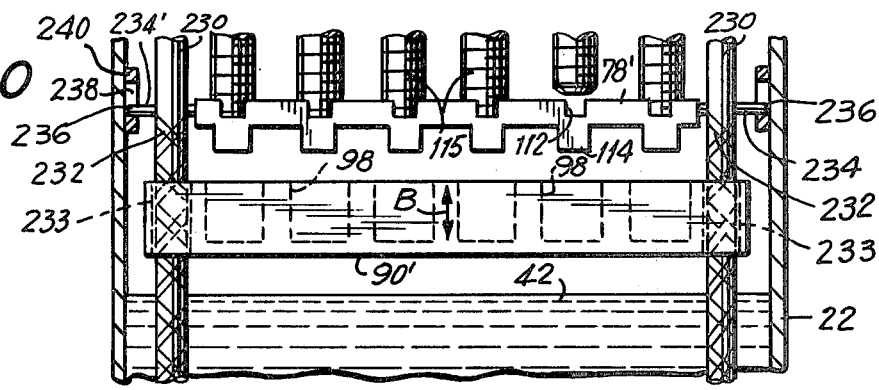
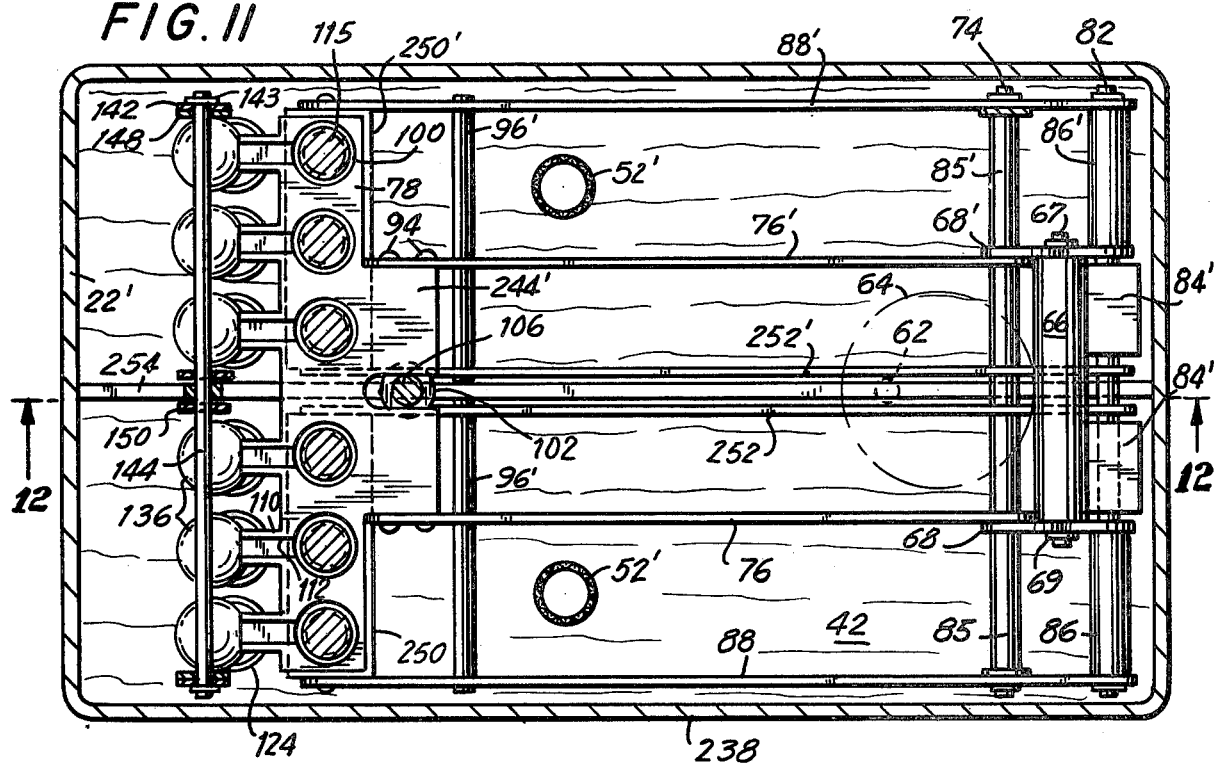
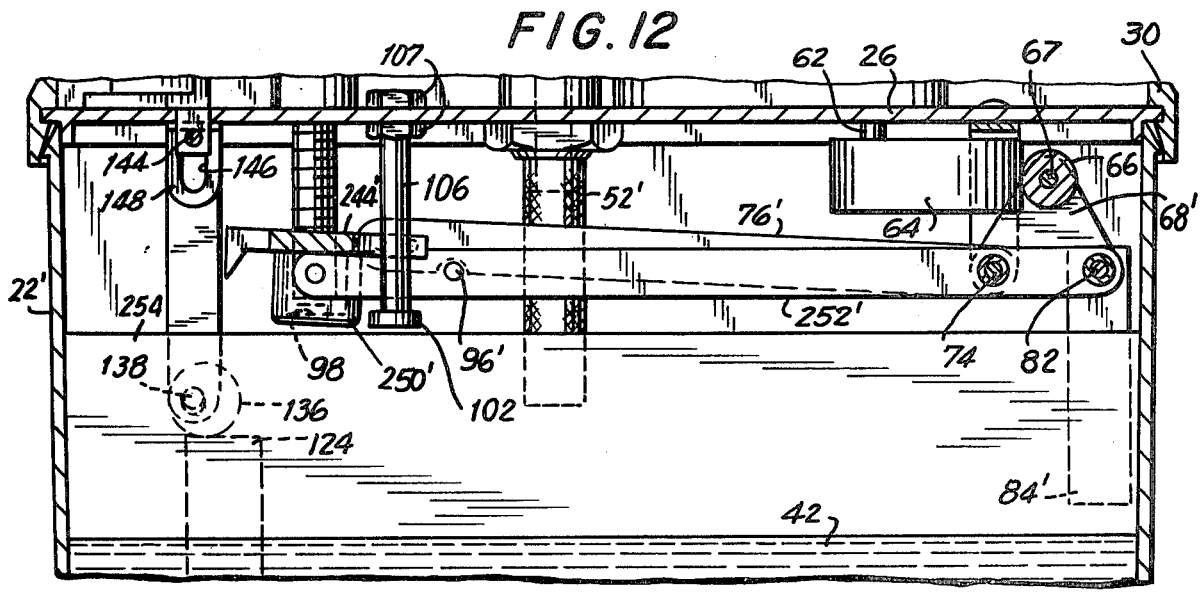

LIQUID OIL FEEDERS

BACKGROUND OF THE INVENTION

This invention relates generally to a liquid-oil feeder capable of feeding a number of oil lines with varying metered amounts of oil. Industrial machines frequently require a constant supply of oil to various regions, such as bearing surfaces. In certain cases, various bearing surfaces may require different amounts, as well as different types of lubricating oil. Furthermore, certain applications require the supply of lubricating oil to be in a continuous flow of droplets, and certain applications require a periodic "flushing" with a continuous flow of oil. It is also desirable to provide a method of instantaneously halting the flow of oil droplets. Various attempts at providing an intermittent liquid-oil feeder capable of supplying bearings with their varied requirements for oil have been made, but such attempts have been less than completely satisfactory in that the devices were incapable of supplying the numerous combinations of grade, type and number of flows required.

SUMMARY OF THE INVENTION

Generally speaking, in accordance with the invention, a liquid-oil feeder is provided for supplying a metered flow of oil to an outlet. The device includes a tank holding a supply of oil; means reciprocably displacing oil pick-up means having at least one oil-carrying chamber open at the top thereof into and out of the supply of oil; a transfer plate contacted by said oil pick-up means at an upper portion of said displacement, the transfer plate having an opening in registration with said chamber opening; and at least one longitudinally adjustable rod positioned in registration with the chamber and transfer plate openings and mounted above the transfer plate for insertion through said openings into said chamber for displacing the oil from the chamber to the transfer plate. The transfer plate is provided with means for directing the oil to at least one outlet.

Means may be provided for selectively sealing each outlet to stop the flow of oil. A plurality of said chambers, adjustable rods and outlets may be provided for permitting the metering of different selected amounts of oil to each outlet. In such an embodiment, the transfer plate would have means for directing the oil displaced from each chamber to an associated outlet.

Also provided is an apparatus for "flushing" certain regions by supplying a stream of oil to the regions. Additionally, various alternative embodiments are provided, including a metering insert for converting the discontinuous supply of oil from the chambers to a continuous stream of droplets. A divided tank may also be used in order to supply a different grade, type or viscosity of oil to certain regions, the oil pick-up means associated with the respective compartments of the tank being displaced as a unit.

Accordingly, it is an object of this invention to provide an intermittent liquid-oil feeder capable of supplying a number of regions with variable amounts of oil from the same tank.

Another object of this invention is to provide an intermittent liquid-oil feeder capable of supplying oil in a continuous stream of droplets.

Yet another object of this invention is to provide an intermittent liquid-oil feeder capable of quickly shutting off the flow of oil to all regions.

A further object of this invention is to provide an intermittent liquid-oil feeder which may be used to provide a stream of oil for flushing.

Still another object of this invention is to provide an intermittent liquid-oil feeder which may be used to supply at least two different types of oil to various regions.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 6 is a partial enlarged sectional view taken along line 6—6 of FIG. 5;

FIG. 7 is a partial sectional view taken along line 7—7 of FIG. 6;

FIG. 8 is a sectional view of another embodiment of an outlet tube having a metering insert to produce a continuous flow of oil droplets;

FIG. 9 is a partial sectional view taken along line 9—9 of FIG. 2;

FIG. 10 is a partial sectional view of a second embodiment of the instant invention, showing alternative means for the reciprocation of the oil pick-up chambers;

FIG. 11 is a sectional view of a third embodiment of the instant invention having a partitioned tank;

FIG. 12 is a partial sectional view taken along line 12—12 of FIG. 11;

FIG. 13 is a partial sectional view of a fourth embodiment of the instant invention showing another embodiment of a metering cup for metering a continuous flow of oil droplets; and FIG. 14 is a partial sectional view taken along line 14—14 of FIG. 13.

DESCRIPTION OF THE PREFERRED EMBODIMENTS

Figure 1:
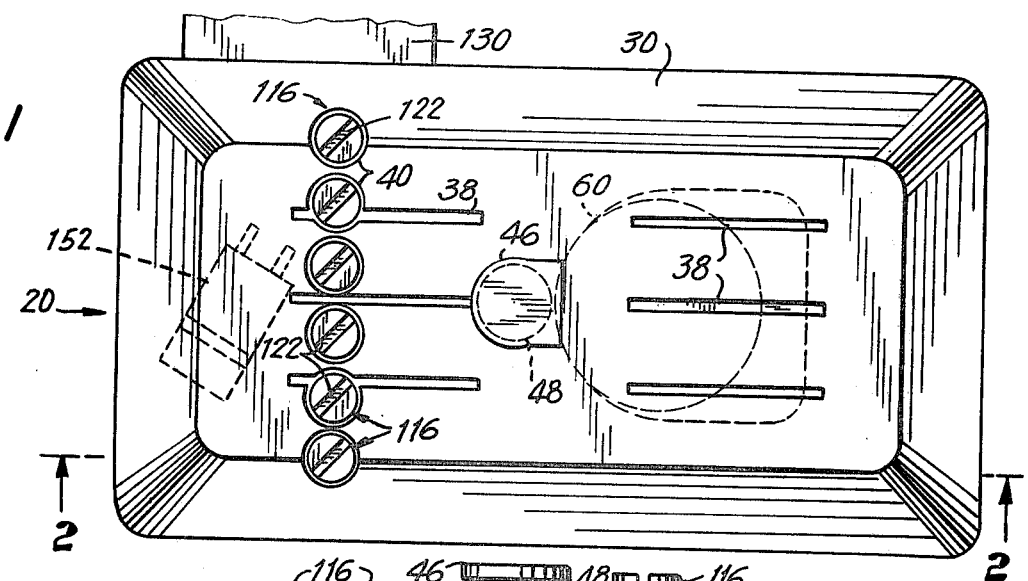
FIG. 1 is a top plan view of a liquid-oil feeder constructed in accordance with a preferred embodiment of the instant invention.

An intermittent liquid oil feeder indicated generally at 20 has a rectangular tank 22 having an externally projecting lip 24 along its upper edge. A top plate 26 rests on the top edge of tank 22 and is formed with a down-turned rim 28 spaced inwardly from the periphery of top plate 26. Rim 28 serves to laterally position plate 26 on the tank 22 and may abut the inner surface of the tank. A cover 30, in the shape of a truncated pyramid, is formed with a peripheral slot 32 in the lower rim 34 thereof. Cover 30 is preferably formed of a resilient material so that the periphery of top plate 26 may be releasably received and retained within slot 34. The inner wall of lower rim 34 of cover 30 is provided with an inclined surface 33 which facilitates the mounting of top plate 26 within slot 32. Cover 30 may also be provided with resilient locking tabs (not shown) for releasably engaging lip 24 to secure cover 30 in place Cover 30 is provided, in its upper surface, with a series of vent slots 38 and a group of openings 40 arranged in a line extending laterally of tank 22 to provide access to components of the oil feeder in accordance with the invention as more particularly described below. Tank 22 contains a supply of oil 42 which may be maintained through filler cap assembly 44 mounted to top plate 26 and projecting through a further opening 58 in cover 30. Filler cap assembly 44 includes a cap 46 hingedly mounted to an inlet pipe 48. Inlet pipe 48 is press-fitted in an upper portion of a radially extending bore 50 in adapter 54. The lower portion of bore 50 is of reduced diameter and communicates with a screen 52 mounted on the lower portion of adapter 54, which in turn provides communication to the inside of the tank 22. Adapter 54 is provided with a threaded lower region for cooperation with nut 56 which serves to hold the adapter, and therefore the entire filler cap assembly 44, in position on top plate 26, so that oil applied to inlet pipe 48 (when the hinged cover is lifted) passes into the tank.

Figure 5:
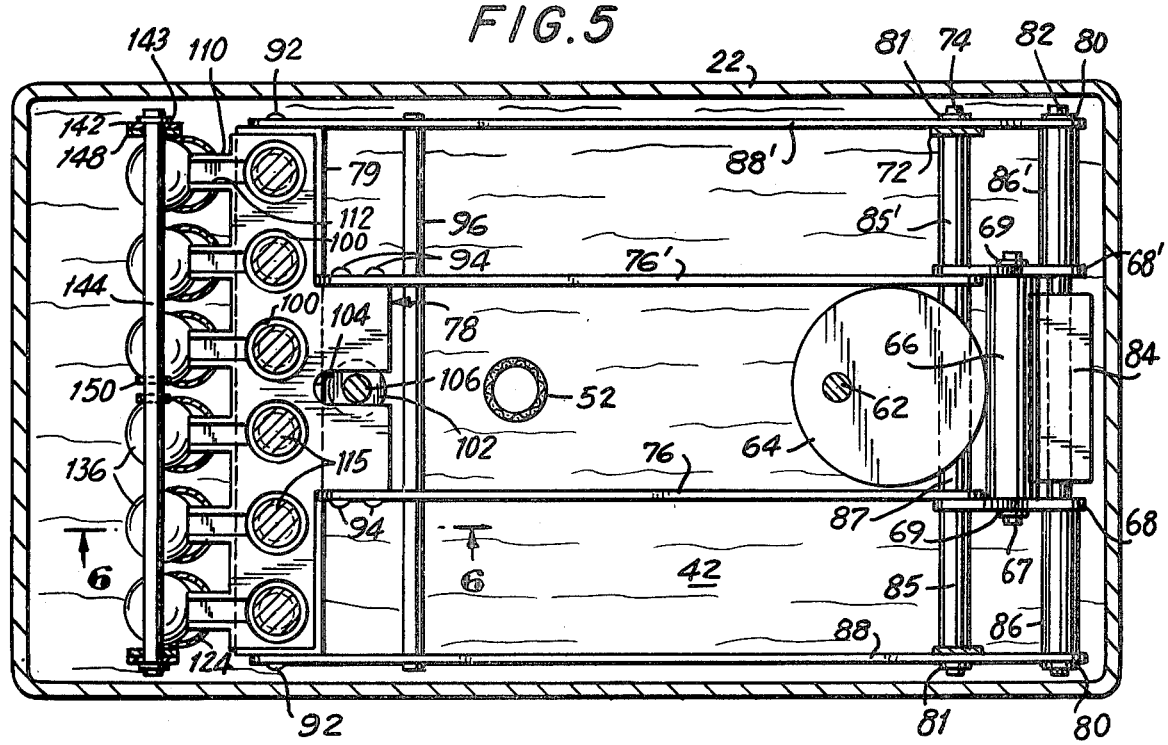
FIG. 5 is a sectional view taken along line 5—5 of FIG. 4.

Mounted to the upper surface of top plate 26 is an electric motor 60 having a drive shaft 62 which extends through an opening in top plate 26. A disc-shaped cam 64 is eccentrically mounted to drive shaft 62, the peripheral surface 65 of cam 64 defining a camming surface which engages and reciprocally displaces a cylindrically-shaped cam follower 66. Cam follower 66 is mounted on an axial shaft 67 (FIG. 5), which is rotatably mounted at respective ends to one corner of triangular brackets 68,68′ by means of lock washers 69. The triangular brackets 68,68′ are themselves pivotably mounted at a second corner thereof to a transverse rod 74 which is supported, at the ends thereof, on the arms of a U-shaped bracket 72 fixedly mounted to the bottom surface of top plate 26 by means of bolts 71, the arms of bracket 72 depending downwardly from said top plate 26.

A second transverse rod 82 is mounted to the third corner of triangular brackets 68,68′ for displacement about the fixed axis defined by first transverse rod 74 in response to the displacement of cam follower 66 by the rotation of disc-shaped cam 64. A counterweight 84 is pivotably mounted centrally on second transverse rod 82 intermediate brackets 68,68′. A pair of oil-pick-up arms 88,88′ are respectively mounted at one end thereof to the respective ends of second transverse rod 82. Said oil-pick-up arms are positioned on second transverse rod 82 relative to brackets 68,68′ respectively by a pair of cylindrical spacers 86,86′ and are held in position by a pair of lock washers 80. Oil-pick-up arms 88 and 88′ are pivotably mounted on the ends of first transverse rod 74 at a point on said oil-pick-up arms spaced from second transverse rod 82 so that said two oil-pick-up arms extend substantially parallel to each other, said first and second transverse rods 74,82 likewise extending substantially parallel to each other. Oil-pick-up arms 88,88′ are held in place on first transverse rod 74 by means of a pair of lock washers 81 and a pair of cylindrical spacers 85,85′ are mounted on first transverse rod 74 intermediate the arms of bracket 72 and triangular brackets 68,68′.

Also pivotably mounted to first transverse rod 74 are a pair of spaced, substantially parallel-extending transfer plate arms 76,76′ held in spaced relation intermediate brackets 68,68′ by a spacer 87.

An oil-pick-up bar 90 is pivotably mounted between the ends of oil-pick-up arms 88,88′ by means of pins 92,92′. Oil-pick-up bars 88,88′ are also joined at a point spaced inwardly from the respective ends thereof supporting oil-pick-up bar 90 by means of a support rod 96. Oil-pick-up bar 90 is provided with a plurality of spaced chambers 98 opening on the top surface 99 of oil-pick-up bar 90. Transfer plate bars 76,76′ support, at the ends thereof, a transfer plate 78 by means of bolts 94. Transfer plate 78 is provided with a transfer portion 79 formed with a plurality of spaced openings 100 therethrough in respective registration with the openings to chambers 98 of oil-pick-up bar 90. Transfer portion 79 is provided with a flat bottom surface 83 for engaging against the correspondingly flat upper surface 99 of oil-pick-up bar 90 so that a seal is provided therebetween to prevent the passage of oil therebetween when said surfaces are in engagement, as more particularly described below. Projecting forwardly from transfer portion 79 are a plurality of spouts 110, one such spout being provided for each opening 100. The upper surface of transfer portion 79 is provided with a trough 112 (FIG. 6) providing communication from each opening 100 to the end of the corresponding spout 110. Each spout is provided with a downwardly extending lip 114 for directing the flow of oil, as more particularly described below. Transfer plate 78 is also formed with a notch 104 in the rear thereof for receiving a vertically extending rod 106 having a head 102 at the lower end thereof, rod 106 having a threaded end for mounting to top plate 26 by means of nuts 107.

Top plate 26 is provided with a plurality of apertures 117 (FIGS. 6 and 7) therethrough in registration with the openings 100 in transfer plate 78. A collar 118, having a threaded bore 119 therethrough, is positioned in each aperture 117. Mounted in each threaded bore 119 is a metering rod 116 having a threaded lower portion 115 which rides in bore 119, the end of threaded portion 115 of metering rod 116 being adapted, when properly positioned, as more particularly described below, to project through opening 100 in transfer plate 78 into the corresponding chamber 98 of oil-pick-up bar 90. The upper portion 121 of metering rod 116 is of greater diameter than threaded portion 115 to define a limit stop to the downward displacement of metering rod 116. Further, upper portion 121 of metering rod 116 projects upwardly through the corresponding aperture 40 in cover 30 and is provided with a slot 122 at the end thereof for receiving a screwdriver, or the like, for the vertical positioning of metering rod 116.

During normal operation, pick-up bar 90 is adapted for reciprocal displacement in the direction of arrows A into and out of oil 42 for the purposes of refilling chambers 98 therein. Such reciprocal displacement is accomplished by the displacement of cam follower 66 in response to the rotation of cam 64, which serves to pivot triangular brackets 68,68′, counterweight 84, oil-pick-up arms 88,88′ and oil-pick-up bar 90 as a unit, counterweight 84 serving to balance the mechanism against the weight of oil-pick-up bar 90 and the oil carried thereby to minimize the load on motor 60.

Figure 2:
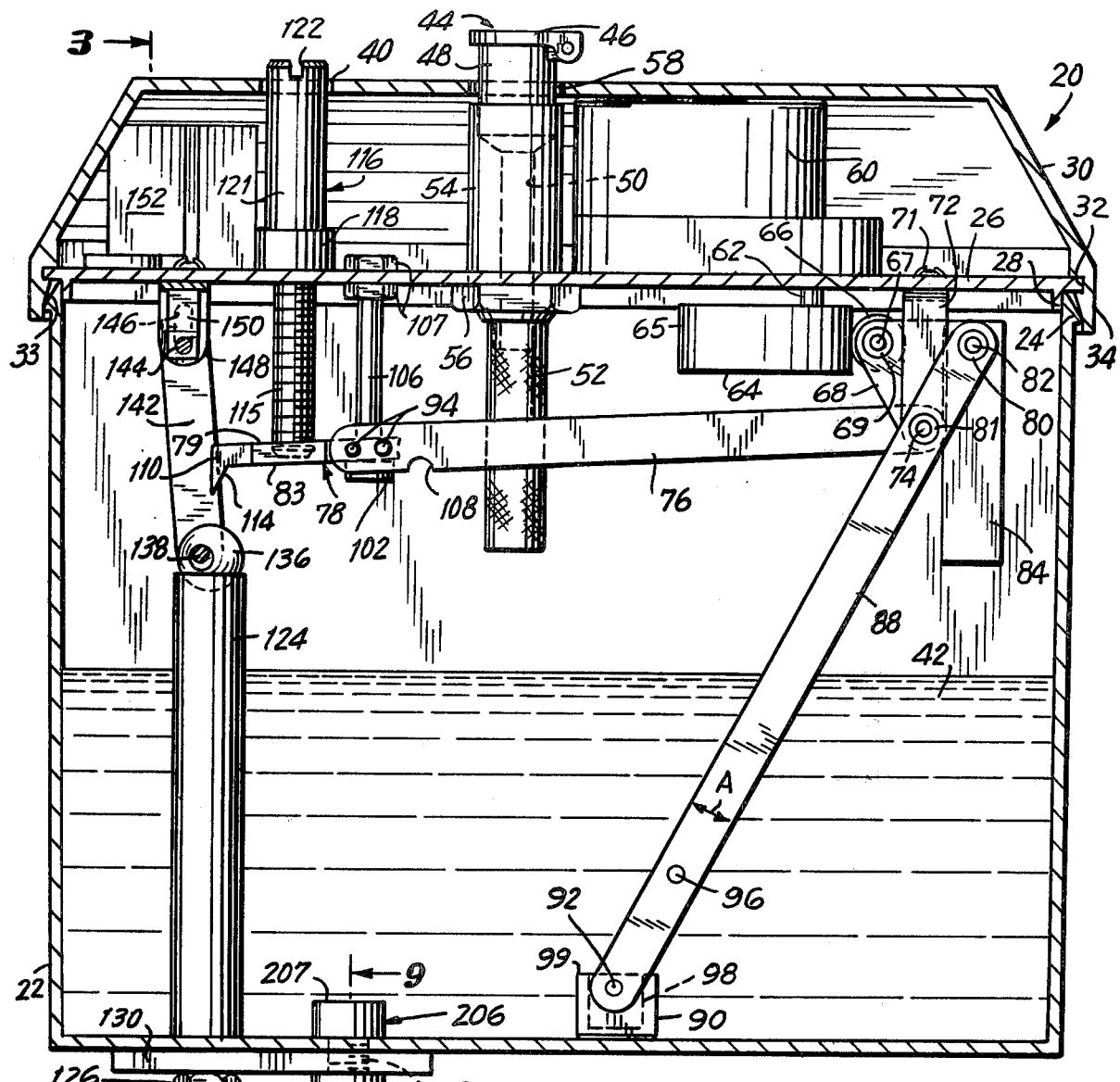
FIG. 2 is a sectional view taken along line 2—2 of FIG. 1.
Figure 4:
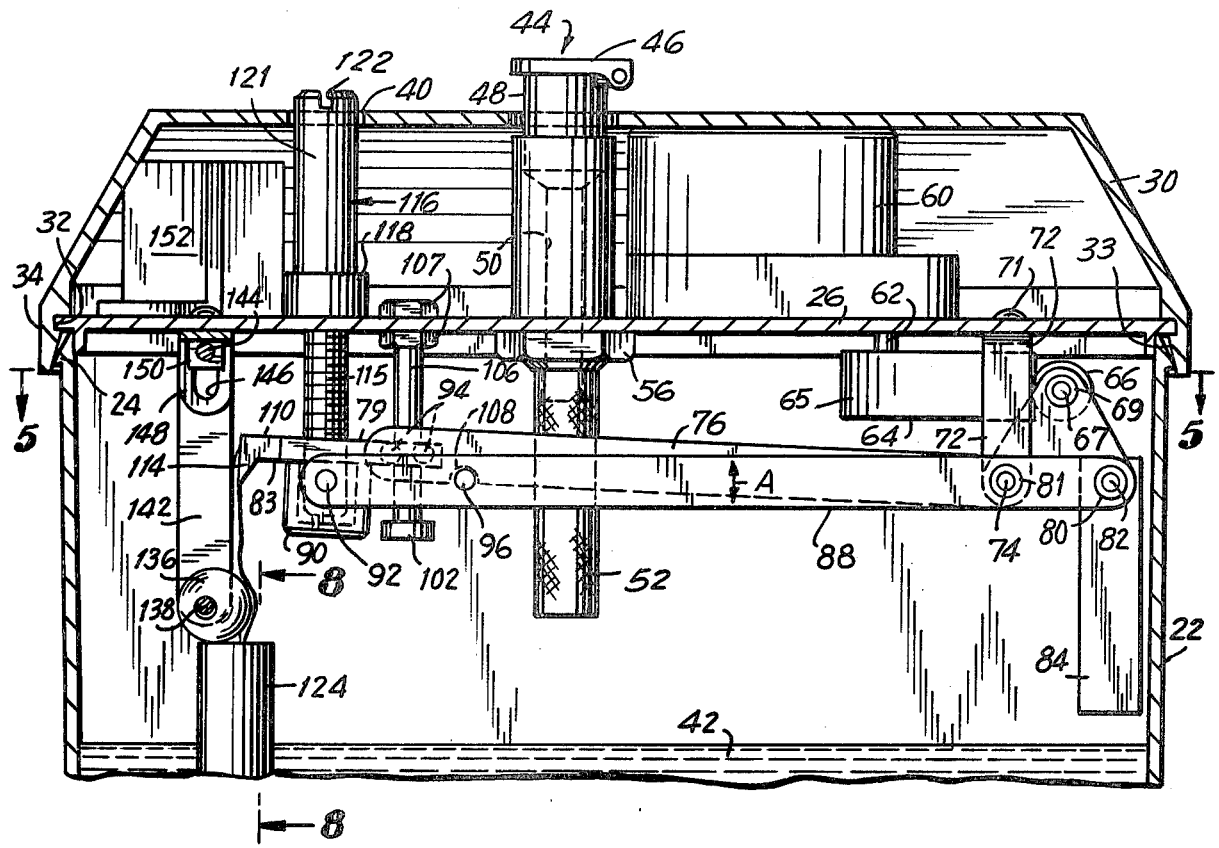
FIG. 4 is a partial sectional view of a first embodiment of the liquid-oil feeder in accordance with the invention with the oil pick-up chambers in their uppermost position abutting the transfer plate.

The oil pick-up bar 90 is depicted in its lowest position in tank 22 in FIG. 2. While in this position, transfer plate 78 and transfer plate arms 76, 76' are in their respective lowest position also as illustrated in FIG. 2. At this position, transfer plate 78 rests on head 102 of rod 106. When the oil pick-up bar 90 is raised up out of the oil 42, through the action of cam 64, eventually top surface 99 of oil pick-up bar 90 engages against the bottom surface 83 of transfer plate 78 so that the transfer plate and transfer plate arms 76, 76' are carried upwardly as a unit with the oil pick-up bar 90. Transfer plate arms 76, 76' are provided with notches 108 in the bottom surface thereof to accommodate support rod 96 as shown in FIGS. 4 and 6. Referring now to FIGS. 6 and 7, it is seen that as the transfer plate 78 and oil pick-up bar 90 are raised together to an upper position illustrated in FIGS. 6 and 7, the threaded lower portion 115 of each metering rod 116 is brought into the corresponding chamber 98 to displace an amount of oil out of chamber 98 through trough 112 so that the oil flows down the lip 114 of the associated spout 110. The precise amount of oil displaced from each chamber 98 depends on the vertical position of metering rod 116 so that either no oil is displaced, a maximum quantity of oil is displaced or any amount of oil intermediate the maximum and zero is displaced from chamber 98 and delivered to spout 110. The cycle continues as cam 64 rotates, lowering the oil pick-up bar 90 and transfer plate 78 until the transfer plate rests on head 102 of rod 106. Oil pick-up bar 90 is freely rotatable on oil pick-up bars 88, 88' so that the chambers 98 remain level.

As more particularly shown in FIGS. 4 and 6, the stream of oil from each spout 110 falls into a corresponding outlet tube 124. Said outlet tubes are more particularly depicted in FIGS. 2 and 8. One outlet tube for each of chambers 98 and in registration with the corresponding spout 110 is provided. Each of the outlet tubes 124 is formed with a threaded base portion 128 terminating in a nipple 134 for connection to an outlet oil line 132. The plurality of outlet tubes 124 are mounted in the bottom of tank 22 with the threaded portion 128 extending through the bottom wall of tank 22 and through a reinforcing plate 130 provided for this purpose. Said outlet tubes are held in place by nuts 126 which cooperate with said threaded portion and a proper seal with the bottom of tank 22 is insured through the provision of an O-ring 171 in a peripheral notch 168, the O-ring engaging the surface of tank 22 as more particularly shown in FIG. 8.

Figure 3:
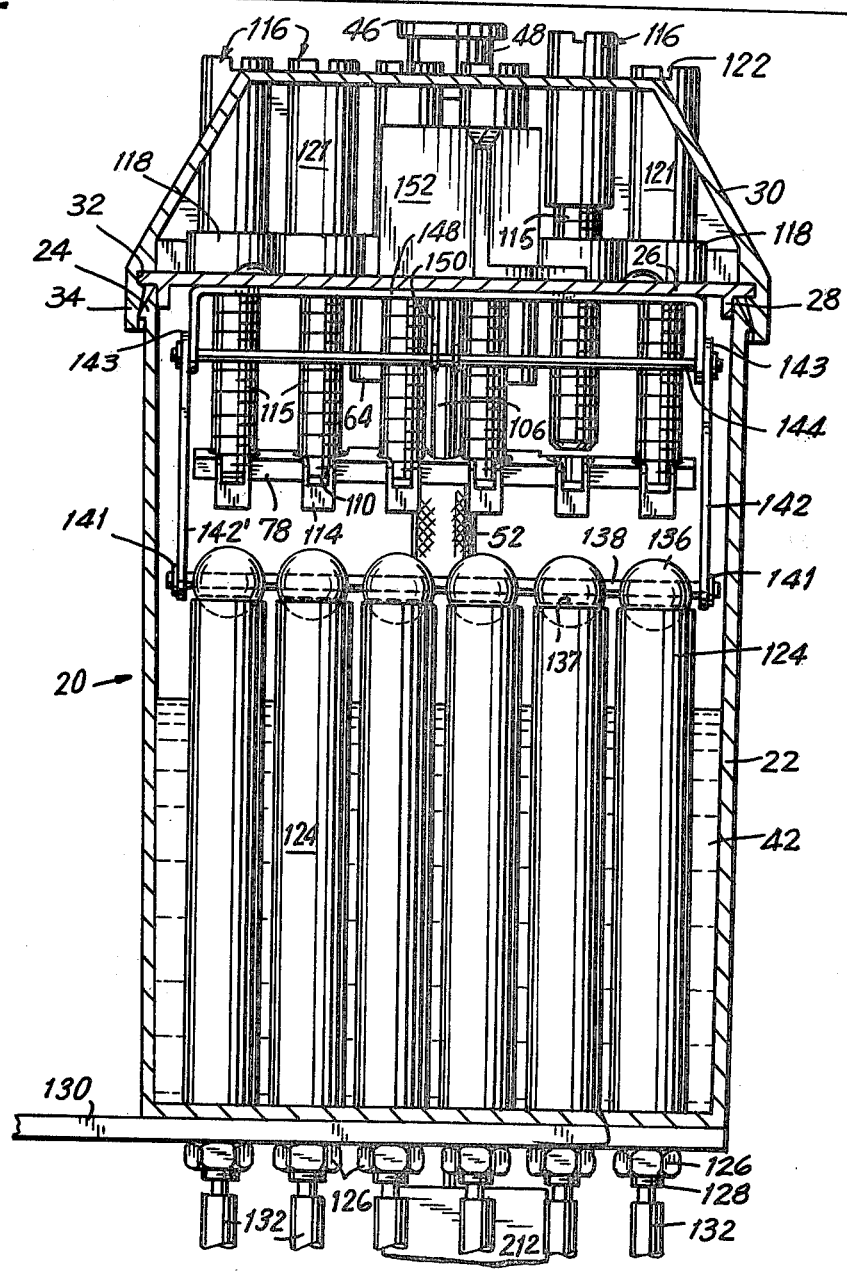
FIG. 3 is a sectional view taken along line 3—3 of FIG. 2.
Figure 2A:
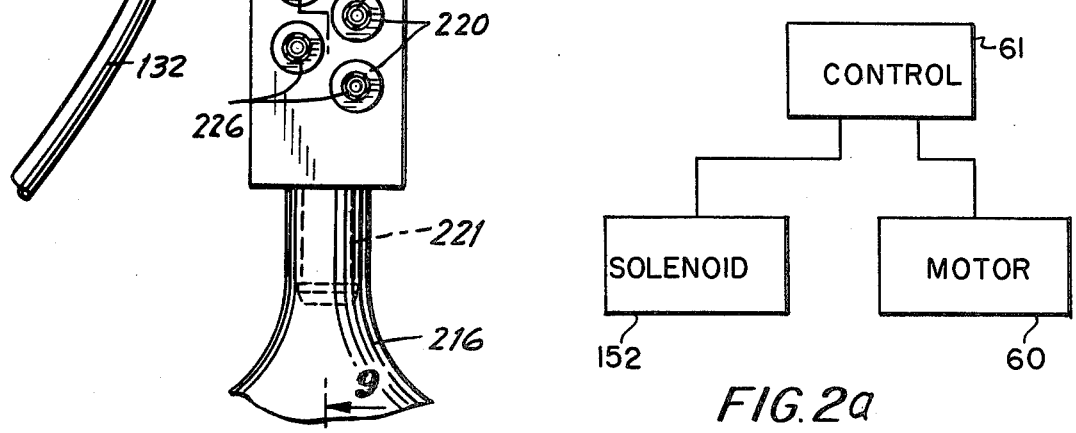
FIG. 2a is a block diagram showing the control of the solenoid and motor of the liquid-oil feeder of FIG. 1.

In order to provide means for cutting off the flow of oil in oil lines 132, a plurality of ball valves 136 are mounted on a rod 138 as more particularly shown in FIGS. 2–6. Balls 136 are provided with an aperture 137 therethrough of greater diameter than the diameter of rod 138. Rod 138 is supported on its ends by a pair of valve support bars 142, 142' and held in place thereon by lock washers 141. Valve support bars 142, 142' are mounted at their upper end to a further rod 144 and held in place thereon by lock washers 143. Further rod 144 rides in vertically extending slots 146 in the downwardly projecting portions of a U-shaped bracket 148. Further rod 144 is mounted in and supported by bracket 150 coupled to the piston (not shown) of a solenoid 152 mounted to the upper surface of top plate 26. The piston of solenoid 152 extends through the top plate. As illustrated in FIGS. 2 and 3, the solenoid is in the "OFF" state wherein the piston thereof is fully extended, further rod 144 rests in the end of slots 146, and ball valves 136 rest in and seal the opening to outlets 124. In this state, motor 60 would likewise be deactivated. Because apertures 137 in balls 136 are larger than rod 138, balls 136 are capable of self-centering on the inlet opening to outlet tubes 124 to seal same. When solenoid 152 is actuated into a "ON" state, balls 136 are raised to a position which opens the inlet openings to the respective outlet tubes 124 as more particularly illustrated in FIG. 4, the entire assembly of rods 138 and 144 and bars 142, 142' being raised as a unit. In this position, as more particularly illustrated in FIGS. 4 and 6, the oil from each spout flows over the corresponding ball 136 into the inlet opening to the associated outlet tube 124. Motor 60 and solenoid 152 may be electrically joined so that the two operate coordinately or separate controls may be provided for solenoid 152 and motor 60 if desired. Coordinate operation of motor 60 and solenoid 152 is schematically illustrated in the block diagram of FIG. 2a wherein a control 61 is connected to each of said solenoid and motor to actuate the solenoid when the motor is operating and deactuates the solenoid when the motor is off.

As described before, during each cycle of the liquid oil feeder in accordance with the invention, a metered quantity of oil is delivered to the input openings of output tubes 124. However, for many applications, it is preferred to deliver the oil to the machine or region to be oiled in a more continuous stream of droplets. One embodiment for achieving this result is depicted in FIG. 8, wherein tube 124 is provided with a metering insert 156. Tube 124 is formed with an upper axial bore region 158 at the inlet opening thereof which communicates with a second axial bore region 162 of a diameter smaller than axial bore region 158, the interface between said regions being defined by a shoulder 160. Second axial bore region 162 is of substantially greater length than first axial bore region 158 and leads to a third, still narrower axial bore region 164, which in turn leads to a still narrower axial bore region 166 which communicates to the associated oil line 132. Received within said first and second axial bore regions is said metering insert 156. Said metering insert is formed with an upper region 172 dimensioned to be received in upper axial bore region 158 and defining a laterally extending shoulder 173 which rests on and engages shoulder 160. A lower portion 180 of metering insert 156 is of smaller diameter than the second axial bore region of outlet tube 124 and is received therein. Metering insert 156 is formed with an axially extending axial chamber 178 which opens on a valve seat wall 174 in the shape of a truncated cone, at the upper end of metering insert 156. Valve seat wall 174 serves as an inlet to chamber 178, the outlet being defined by a relatively narrow axial bore 184 in the end of the lower region 180 of metering insert 156. A pair of laterally extending apertures 182 are formed in the upper wall of lower portion 180 of metering insert 156 adjacent shoulder 173.

As the metered quantity of oil 42 flows past ball valve 136 into chamber 178 of metering insert 156, the chamber tends to fill up. The contents of the chamber drips slowly out of exit bore 184 during that portion of the cycle between displacements of oil from the refilled chambers by the metering rods 116. In this manner, the flow of oil to oil line 132 is spread out to present a relatively uniform series of droplets. Chamber 178 is dimensioned to accommodate the maximum amount of oil which would displaced from a chamber 98 of oil pick-up bar 90. Apertures 182 are provided in case dirt or other contaminant plugs bore 184, in which case the oil can flow through apertures 182 and while the full droplet effect will not be produced, the liquid oil feeder will nonetheless operate.

While outlet tubes 124 are shown extending through the bottom wall of tank 22 and the oil 42, tank 22 can be formed with an outwardly stepped wall above the oil level in which outlet tubes 124 are mounted.

Referring to FIGS. 13 and 14, an alternate metering embodiment is depicted. Specifically, ball valve 136 is replaced by a combined valve and metering member 188 formed with an aperture 192 therethrough to loosely accommodate rod 138 in the same manner that ball 136 is received. Valve and metering member 188 is formed with a chamber 198 which receives the metered quantity of oil from the corresponding spout 110, the outlet to chamber 198 being bore 196 in the bottom of said chamber, said bore being displaced laterally from the axis of member 188. The lower region 186 of member 188 is formed with a conical valve surface 190. A circular groove 191 is formed in valve surface 190 to receive a O-ring 194. Outlet tube 124 is replaced by an outlet tube 200 which has an axial bore 201 therethrough terminating in a first frusto-conical surface 199 which in turn terminates in a second frusto-conical surface 202 inclined at a steeper angle to the axis than said first surface 199. O-ring 194 engages second surface 199. When solenoid 152 is in the "OFF" state, bar 138 is lowered and metering and valve member 188 centers in and seals the inlet opening to outlet tube 200 by the engagement of O-ring 194 and surface 199. When bar 138 is raised by the actuation of solenoid 152, and the cycle of the oil feeder proceeds, the oil is delivered in metered quantities to chamber 198 and drips out of bore 196 for delivery in a more evenly distributed droplet flow. Should bore 196 be ostructed by dirt or other contaminants, the oil delivered to chamber 198 can flow out of said chamber through the enlarged aperture 192 and down the outer walls of metering end valve member 188 into the inlet opening of outlet tube 200. Accordingly, the embodiment of FIGS. 13 and 14 functions in the same manner as the embodiment of FIG. 8. It should be noted that the height of the respective outlet tubes 124 is selected to stand above the normal height of the oil 42 within tank 22.

In certain instances, it is desirable to "flush" some machine regions with a continuous stream of oil. Referring to FIGS. 2 and 9, a flusher device 204 for this purpose is mounted on tank 22. Flusher 204 is mounted in the bottom of tank 22 in the region of support plate 130 by means of a fitting 206 formed with an axial bore 210 therethrough, an upper region 207 of enlarged diameter supporting an O-ring 208 in engagement with the inner surface of tank 22, and a lower threaded region 209 which passes through an aperture in tank 22 and support plate 130. A second fitting 211 is formed with an axial threaded bore 213 for threading engagement with the lower region 209 of first fitting 206. Second fitting 211 supports a second O-ring 208' engaging the lower surface of plate 130 and is formed with a lower threaded region 215' received in a threaded opening 217 in distribution manifold 212. Said distribution manifold is provided with a main channel 215 which communicates to opening 217 through a throat 219. Throat 219 may be closed, as illustrated in FIG. 9, by a ball check valve 214 which normally rests on pin 218 when in the opened position. Manifold 212 is provided with a downwardly depending nipple 221 which defines the end of channel 215, said channel opening into a bulb 216 mounted on nipple 221. Oil 42 from tank 22 will normally fill channel 215 and bulb 216 since throat 219 is normally open. Bulb 216 is formed of a flexible material such as rubber or plastic. The outlets to channel 215 are through four laterally extending outlet bores 222, one of which is shown in cross-section in FIG. 9. Each of the lateral bores 222 communicates to a valve chamber 223 which opens to a lateral bore 224 in a nipple 225. An oil line 226 is mounted on the end of each of the nipples 225, four such oil lines being provided. Received within valve chamber 223 is a displaceable valve member 227 normally held in a position to seal bore 222 in conjunction with O-ring 228, through the action of coil spring 229.

When the flushing function is to be performed, the user merely squeezes bulb 216 which causes the oil therein to close ball check valve 214 and open valves 227 to cause the oil in reservoir 216 to flow out of oil lines 226 in a continuous stream. Each squeezing of bulb 216 transmits a stream of oil through each of the oil outlet lines 226. Oil outlet lines 226 may be connected to either the same or different locations than were oil lines 132.

While the embodiment of FIGS. 1-8 is characterized by the pivotable reciprocal displacement of the oil pick-up bar 90, other means of displacement may be utilized. One alternate embodiment is depicted in FIG. 10, where like reference numerals are applied to like elements. In the embodiment of FIG. 10, the oil pick-up bar 90' is displaced vertically in the direction of arrows B by means of a conventional self-reversing drive shaft arrangement. Specifically, a pair of drive shafts 230 are continuously rotated in the same direction by a motor. The shafts are provided with a pair of crossed helical channels 232 joined at their opposed ends to define an endless path, one of the helical channels defining an ascending path, the other helical channel defining a descending path. The shafts 230 are journaled through fittings 233 mounted in oil pick-up bar 90', each of said fittings including ball bearings (not shown) which ride in the channels. As the shafts 230 are rotated continuously, the ball bearings riding in the channels carry the oil pick-up bar 90' up and down between a maximum upper position and a maximum lower position in a reciprocal manner. In this embodiment, transfer plate 78' is supported by a pair of pins 236 which ride in channels 238 formed in a wall-mounted bracket 240. In this manner, the oil pick-up bar 90 engages and carries upwardly the transfer plate 78' in the same manner as was achieved in the embodiment of FIGS. 1-8.

In some instances, it is desirable to selectively feed more than one type of oil using a single device. The embodiment for achieving this result is depicted in FIGS. 11 and 12, like reference numerals being applied to like elements. In this embodiment, transfer plate 78 and transfer plate bars 76 and 76' remain unchanged. However, oil pick-up bar 90 is replaced by two oil pick-up bars 250 and 250' which together correspond to oil pick-up bar 90 but a gap between the two separate bars is provided. Oil pick-up bar 250 is supported by oil pick-up arm 88 and an additional central arm 252 mounted on first and second transverse rods 74 and 82 in the same manner as was oil pick-up arms 88, 88'. Similarly, oil pick-up bar 250' is supported on oil pick-up arm 88' and a central oil pick-up arm 252'.

In the embodiments of FIGS. 11 and 12, tank 22' is divided into two sections by a partition 254 which extends upwardly from the bottom of the tank substantially parallel to the oil pick-up arms 88, 88' in the region of the gap between oil pick-up bars 250 and 250' to a height immediately below the lowest point reached by transfer plate 78, as defined by head 102 of rod 106. Oil pick-up bars 250 and 250' are displaced as a unit in the same manner as was oil pick-up bar 90 but on opposed sides of partition 254. In other respects, the liquid oil feeder of FIGS. 11 and 12 operates in the same manner as did the liquid oil feeder of FIGS. 1-8.

Two inlet pipes 48' having screens 52' would be provided, providing access to the two compartments defined by partition 254. In this manner, different types and grades of oil can be delivered from the two compartments by the liquid-oil feeder of FIGS. 11 and 12. If additional compartments are required, additional partitions may be provided, in which case, all that would be required would be to further divide the oil pick-up bar and provide additional oil pick-up arms. It is noted that in the embodiment of FIGS. 11 and 12, counterweight 84 has been replaced by a pair of counterweights 84' and support rod 96 has been replaced by a pair of support rods 96', all serving the same function as in the embodiment of FIGS. 1-8.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A liquid-oil feeder comprising tank means for holding a supply of oil; oil pick-up means having at least one oil-carrying chamber having an opening at the top thereof; means for reciprocally displacing said oil pick-up means into and out of said supply of oil along a path; a transfer plate mounted for displacement in an upper portion of said displacement path between a first lower position and a second higher position, said oil pick-up means contacting and displacing said transfer placed between said first and second positions, said transfer plate having an opening in registration with said chamber opening; and at least one longitudinally adjustable rod positioned for registration with said chamber and transfer plate openings when said transfer plate and oil pick-up means are in and between said first and second positions and mounted above said transfer plate for insertion through said openings into said chamber during the displacement of said oil pick-up means and transfer plate from said first and second position for displacing a selected portion of the oil from said chamber to said transfer plate; and further including at least one outlet not normally connected to said supply of oil, said transfer plate including means for directing the oil from said chamber to said outlet.

2. The liquid oil feeder as claimed in claim 1, wherein said outlet is defined by a outlet tube extending through the bottom wall of said tank through said supply of oil to a point above the surface of said supply of oil in registration with said oil directing means of said transfer plate.

3. The liquid oil feeder as claimed in claim 1, wherein said means for reciprocally displacing said oil pick-up means includes at least one drive shaft means continuously rotating in a single direction and formed with a pair of helical grooves therein joined at their respective ends, and follower means supporting said oil pick-up means and riding in said grooves for the reciprocal displacement of said oil pick-up means along a path substantially parallel to said drive shaft means.

4. The liquid oil feeder as claimed in claim 1, wherein said oil-directing means in said transfer plate includes a trough in the upper surface of said transfer plate leading from said transfer plate opening.

5. The liquid oil feeder as claimed in claim 4, wherein said transfer plate includes a spout projecting from said transfer plate and having said trough formed therein, said trough terminating at the end of said spout for directing said oil to said outlet.

6. The liquid oil feeder as claimed in claim 1, including at least a plurality of said chambers in said oil pick-up means, a corresponding plurality of openings and directing means in said transfer plate and a corresponding plurality of outlets each associated with one of said oil pick-up means chambers and transfer means directing means.

7. The liquid oil feeder as claimed in claim 6, wherein said tank means includes partition means dividing said tank means into at least two compartments; said oil pick-up means including at least two oil pick-up members each formed with at least one oil-carrying chamber open at the top thereof and positioned on opposed sides of said partition, said reciprocal displacement means displacing both of said oil pick-up members into and out of said supply of oil along a path.

8. The liquid oil feeder as claimed in claim 1, including metering means intermediate said transfer plate oil directing means and said outlet for spreading the flow of the oil displaced from said oil pick-up means chamber over at least a portion of the cycle of the displacement of said oil pick-up means.

9. The liquid oil feeder as claimed in claim 8, wherein said outlet is defined by an outlet tube extending through the bottom wall of said tank through said supply of oil to a point above the surface of said supply of oil in registration with said oil directing means of said transfer plate, said metering means including metering cup means mounted in said outlet tube and defining a chamber for receipt of the oil displaced from said oil pick-up means chamber, said metering cup means being formed with a bore in the bottom thereof permitting the flow of oil in said metering cup means chamber to said outlet over said portion of the cycle of the displacement of said oil pick-up means.

10. The liquid oil feeder as claimed in claim 9, wherein said metering cup means is formed with at least one aperture therein providing communication between said outlet and an upper region of said metering cup chamber.

11. The liquid oil feeder as claimed in claim 1, including flusher means connected to a lower region of said tank for receiving oil from said supply of oil and selectively transmitting said received oil in a stream.

12. The liquid oil feeder as claimed in claim 11, wherein said flusher means includes manifold means operatively coupled to the interior of said tank means and including an oil storage chamber, said manifold means including first normally open valve means communicating to the interior of said tank means so that said chamber is normally filled with oil from said tank means and second normally closed valve means through which said stream of oil is to be delivered, said flusher means including means for selectively applying pressure to the oil in said manifold oil storage chamber to close said first valve means and open said second valve means for the forcing of at least a portion of the oil in said manifold chamber in a stream out of said manifold.

13. The liquid oil feeder as claimed in claim 12, wherein said pressure applying means includes a flexible bulb communicating with said manifold chamber and receiving oil therefrom and from said tank means, whereby squeezing of said oil-filled bulb means applies said pressure to said oil within said oil-storage chamber of said manifold means.

14. The liquid oil feeder as claimed in claim 1, wherein said means for reciprocally displacing said oil pick-up means includes pivotably mounted first arm means supporting said oil pick-up means at one end thereof, and means operatively coupled to said first arm means for reciprocally pivoting said first arm means to effect the reciprocal displacement of said oil pick-up means.

15. The liquid oil feeder as claimed in claim 14, including counterweight means supported at the other end of said first arm means, said first arm means being pivotably mounted at a point intermediate its ends.

16. The liquid oil feeder as claimed in claim 14, wherein said reciprocal pivoting means includes continuously rotating cam means and cam follower means mounted on said first arm means in operative engagement with said cam means to effect reciprocal pivoting of said first arm means.

17. The liquid oil feeder as claimed in claim 14, wherein said oil pick-up means is pivotably mounted on the end of said arm means.

18. The liquid oil feeder as claimed in claim 14, including second arm means freely pivotably mounted and supporting said transfer plate at one end thereof and stop means for supporting said transfer plate means in the path of displacement of said oil pick-up means at said first position.

19. The liquid oil feeder as claimed in claim 18, wherein said support means normally supports said transfer plate at said first position below the upper end of the path of displacement of said oil pick-up means and permits the pivotable displacement of said transfer plate to and from said second position at the upper end of said path of said oil pick-up means.

20. The liquid oil feeder as claimed in claim 1, including valve means for selectively sealing said outlet.

21. The liquid oil feeder as claimed in claim 20, wherein said valve means includes valve support means operatively displaceable between an open and a closed position and self-centering valve means supported by said valve support means for seating in said outlet for sealing said outlet.

22. The liquid oil feeder as claimed in claim 21, wherein said valve support means includes a laterally extending bar, said self-centering valve means including a ball formed with an aperture therethrough of a diameter greater than said bar, said bar being journaled through said aperture for the displacement of said ball.

23. The liquid oil feeder as claimed in claim 20, wherein said valve means includes solenoid means for selectively opening and closing said valve means.

24. The liquid oil feeder as claimed in claim 23, including means for coordinately actuating said solenoid means and said reciprocal displacement means for said oil pick-up means whereby said valve means closes said outlet when said reciprocal displacement means is off and opens said outlet when said reciprocal displacement means is displacing said oil pick-up means.

25. The liquid oil feeder as claimed in claim 21, wherein said self-centering valve means includes metering cup means formed with a chamber for receiving oil from said transfer plate and a bore communicating from the bottom of said chamber to said outlet when said valve means is open to permit the passage of droplets of oil to said outlet to spread the delivery of oil to the outlet over at least a portion of the cycle of the displacement of said oil pick-up means, said metering cup means including a lower valve portion for cooperation with said outlet when said valve means is closed to seal said outlet and the bore in said metering cup means, said valve support means including a bar, said metering cup means further including apertures in the upper region of the chamber thereof of a diameter greater than the diameter of said bar for receiving said bar for support of said metering cup means in said open position.

26. The liquid oil feeder comprising tank means for holding a supply of oil; oil pick-up means having at least one oil-carrying chamber having an opening at the top thereof; means for reciprocally displacing said oil pick-up means into and out of said supply of oil along a path; at least one longitudinally adjustable rod positioned in registration with said chamber opening and mounted above said chamber opening for insertion through said opening into said chamber at an upper portion of said path for displacing a selected portion of the oil from said chamber; at least one outlet not normally connected to said supply of oil; and means directing said displaced oil from said oil-carrying chamber to said outlet, said displaced oil directing means including metering means formed with a chamber for receiving and collecting said displaced oil and having a metering aperture in the region of the bottom of said metering means chamber permitting the passage of said displaced oil in said metering means chamber to said outlet over at least a portion of the cycle of displacement of said oil pick-up means greater than the portion of the cycle of displacement of said oil pick-up means during which said oil would pass from said oil carrying chamber to said outlet in the absence of said metering means.

27. The liquid oil feeder as claimed in claim 26, wherein said metering means includes at least one further aperture in an upper region of said metering means chamber.

28. A liquid-oil feeder comprising tank means for holding a supply of oil; oil pick-up means having at least one oil-carrying chamber having an opening at the top thereof; means for reciprocally displacing said oil pick-up means into and out of said supply of oil along a path, said means for reciprocally displacing said oil pick up means including pivotably mounted first arm means supporting said oil pick-up means at one end thereof and means for reciprocally pivoting said first arm means to effect the reciprocal displacement of said oil pick-up means, a transfer plate contacted by said oil pick-up means at an upper portion of said displacement plate; said transfer plate having an opening in registration with said chamber opening; and at least one longitudinally adjustable rod positioned in registration with said chamber and transfer plate openings and mounted above said transfer plate for insertion through said opening into said chamber at an upper portion of said displacement path for displacing a selected portion of the oil from said chamber to said transfer plate; and further including at least one outlet not normally connected to said supply of oil, said transfer plate including means for directing the oil from said chamber to said outlet.

29. The liquid oil feeder as claimed in claim 28, wherein said reciprocal pivoting means includes continuously rotating cam means and cam follower means mounted on said first arm means in operative engagement with said cam means to effect reciprocal pivoting of said first arm means.

* * * * *